United States Patent [19]
McNelley

[11] Patent Number: 5,619,254
[45] Date of Patent: Apr. 8, 1997

[54] COMPACT TELECONFERENCING EYE CONTACT TERMINAL

[76] Inventor: Steve H. McNelley, 29677 Woodlake Ct., San Juan Capistrano, Calif. 92675

[21] Appl. No.: 591,115

[22] Filed: Jan. 25, 1996

Related U.S. Application Data

[63] Continuation of Ser. No. 420,201, Apr. 11, 1995, abandoned.
[51] Int. Cl.$^6$ .................................................. H04N 7/14
[52] U.S. Cl. ........................... 348/20; 348/15; 359/460; 359/454
[58] Field of Search .............................. 348/14–20, 207, 348/373, 375, 744, 752; 359/443, 454, 456, 457, 460, 449, 451, 479

[56] References Cited

U.S. PATENT DOCUMENTS

| | | |
|---|---|---|
| 4,400,725 | 8/1983 | Tanigaki . |
| 4,821,307 | 4/1989 | Flint, III .................................. 348/20 |
| 4,928,301 | 5/1990 | Smoot . |
| 5,117,285 | 5/1992 | Nelson et al. . |
| 5,159,445 | 10/1992 | Gitlin et al. . |
| 5,194,955 | 3/1993 | Yoneta et al. ............................ 348/14 |
| 5,243,413 | 9/1993 | Gitlin et al. . |
| 5,278,681 | 1/1994 | Gitlin et al. . |
| 5,400,069 | 3/1995 | Braun et al. ............................ 348/20 |

OTHER PUBLICATIONS

"A Large-Screen Visual Telecommunication Device Enabling Eye Contact", by S. Shiwa et al., NTT Human Interface Laboratories, Yokosuka, Japan, SID 1991 Digest, pp. 327–328.

"A Device That Provides an Eye-to-Eye Video Perspective for Interactive Television", by A. Rodney Wellens, Behavior Research Methods & Instrumentation, 1978, vol. 10(1), pp. 25–26.

*Primary Examiner*—Wing F. Chan
*Attorney, Agent, or Firm*—Price, Gess & Ubell

[57] ABSTRACT

A compact teleconferencing eye contact terminal that can be integrated with a multitude of image display devices. Eye contact is achieved between conferees who share similar eye contact terminals by the use of a uniquely configured integral beam-splitter. The beam-splitter is coated over all or part of its surface so that a region acts as a partially-silvered mirror. The beam-splitter is integral to a transparent substrate member that is configured with subtle curves that permit only a portion of its surface, forming the integral beam-splitter, to be angled at or near 45 degrees from the viewing surface of a display screen. By doing so, the angled portion forming the integral beam-splitter is seamlessly suspended in front of the viewing surface without interfering with the viewing. This uniquely configured beam-splitter permits image capturing without the great increase in depth of terminals or loss of display brightness necessitated by prior art eye contact systems employing partially-silvered mirrors.

29 Claims, 4 Drawing Sheets

COMPACT TELECONFERENCING EYE CONTACT TERMINAL

This is a continuation application of application Ser. No. 08/420,201, filed on Apr. 11, 1995, now abandoned, for a COMPACT TELECONFERENCING EYE CONTACT TERMINAL.

BACKGROUND OF THE INVENTION

1. Field of the Invention

The present invention concerns the field of equipment for video teleconferencing and, more specifically, an improved design for a terminal that allows eye contact between a local conferee and a remote conferee at a second terminal.

2. Description of Related Art

Video-teleconferencing is now positioned to become as common as the telephone conversation. With the recent advances in video signal transmission inexpensive interactive video is quickly becoming a reality. The ability to transmit video, however, is only one necessary element to a successful teleconferencing system. One area of great importance that will determine the success of teleconferencing is the ability to have natural communication. Fundamental to human communication is eye contact. Present teleconferencing devices are unable to provide eye contact because a teleconferencing camera is placed beyond the perimeter of the display imaging the distant conferee to avoid visual interference with that display. With this configuration the conferees fail to look directly into the camera so that conferees appear to be looking away, disinterested in the conversation.

There have been several technologies proposed to correct the eye contact problem. The majority of these technologies require specialized displays that are configured so that a camera can be mounted behind the viewing surface of the display. A great drawback to these technologies is that they cannot be readily integrated with existing television and computer displays owned by consumers. Also, many of these technologies cannot be integrated with various display technologies such as direct view cathode ray tube, plasma display panel, and field emitter display because these devices do not permit a camera to be mounted behind their viewing surfaces. Eye contact can also be achieved through image processing techniques. The drawback to image processed eye contact is that advanced computer hardware and software adds, at present, a significant expense to a teleconferencing terminal.

One of the best-known eye contact technologies is also the most flexible in being combined with various display technologies. A beam-splitter consisting of a half-silvered mirror, when placed at a roughly 45-degree angle in front of any display, will permit light from that display to pass through and be observed by a conferee. Simultaneously, that conferee's image can be captured by a camera placed to capture the image of that conferee reflected in the half-silvered mirror. Even though this technology can be configured in front of the viewing surface of nearly any display, the awkward protrusion of the half-silvered mirror renders the technology clumsy at best. Not only does the protrusion use up a considerable amount of space, but also, the conferee imaged on the display appears to be recessed deep into the terminal, augmenting awareness of distance between conferees.

Another beam-splitter arrangement is similar to this previous technology except the display and camera are reversed and used in a similar manner as a teleprompter. Here the camera is mounted behind the half-silvered mirror and the viewing surface of the display is aimed toward the half-silvered mirror which reflects the display's image. Because the half-silvered mirror is angled at roughly 45 degrees, this configuration suffers from the same drawbacks as the technology previously mentioned.

In an attempt to minimize the drawbacks of these beam-splitter technologies, U.S. Pat. No. 5,117,285 to Nelson teaches the use of a polarizer added to a beam-splitter consisting of a partially-silvered mirror to reduce the protrusion of the partially-silvered mirror from 45 degrees to roughly 30 degrees. The use of polarizers permits the camera to be positioned at an angle where light from the display would normally, without polarizers, prevent quality image reflection. A significant drawback to this technology is that the protrusion of the partially-silvered mirror is not reduced sufficiently for practical use, especially for larger displays. Also, the camera in this arrangement awkwardly protrudes from the base of the display. Another significant drawback is that the addition of polarizers reduces the brightness of the display, greatly reducing image quality.

OBJECTS AND SUMMARY OF THE INVENTION

It is an object of the present invention to provide a uniquely configured beam-splitter that results in significant reduction of protrusion of the beam-splitter from the viewing surface of the display;

It is another object of the present invention to provide a uniquely configured beam-splitter that is built in as a part of a display;

It is a further object of the present invention to provide a uniquely configured beam-splitter that is adaptable to existing teleconferencing displays;

It is yet another object of the present invention to provide a uniquely configured beam-splitter that is flexible and can be collapsed for compact storage;

It is an additional object of the present invention to enable a uniquely configured beam-splitter housing that has a teleconferencing camera that can be easily removed and used for other purposes; and It is another object of the present invention to enable a uniquely configured beam-splitter with various features enabling camera aiming and positioning.

The present invention is a compact teleconferencing eye contact terminal that can be integrated with a variety of image display devices. Eye contact is achieved between conferees who share similar eye contact terminals by the use of a uniquely configured integral beam-splitter. The beam-splitter is coated over all or part of its surface so that a region acts as a partially silvered mirror. The beam-splitter is integral to a transparent member that is configured with subtle curves that permit only a portion of its surface, forming the integral beam-splitter, to be angled at or near 45 degrees from the viewing surface of a display screen. By doing so, the angled portion forming the integral beam-splitter is seamlessly suspended in front of the viewing surface without interfering with the viewing. This uniquely configured beam-splitter permits image capturing without the great size increase and awkward camera position of terminals necessitated by prior art beam-splitter arrangements.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved eye contact terminal through the use of an angled beam-splitter which is integral to a curved transparent substrate which seamlessly suspends the beam-splitter in front of a video display.

Prior Art Arrangements of Front-Mounted Beam-Splitters

Figure 1:
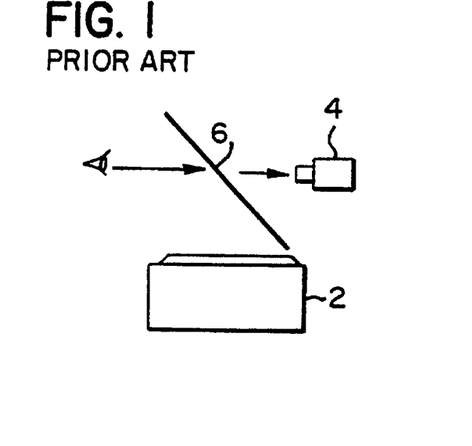
FIG. 1 illustrates a prior art flat beam-splitter arrangement with the camera mounted behind the beam-splitter.

FIG. 1 illustrates a prior art teleconferencing flat beam-splitter arrangement that permits eye contact. A camera 4 is placed behind the viewing side of a half-silvered mirror 6 and captures an image of a first conferee viewing the half-silvered mirror 6. Simultaneously, the image of a display 2 is reflected by the half-silvered mirror 6, permitting eye contact between conferees. Display 2 represents any type of video (visual) display technology capable of producing an image from an electronic signal. The half-silvered mirror is optimally positioned protruding at or near a 45-degree angle to the display and contained in a housing (not shown), thereby adding a considerable bulk to a teleconferencing terminal. An even greater drawback is that this terminal cannot be placed on top of a desk because the display takes up nearly the entire desk surface.

Figure 2:
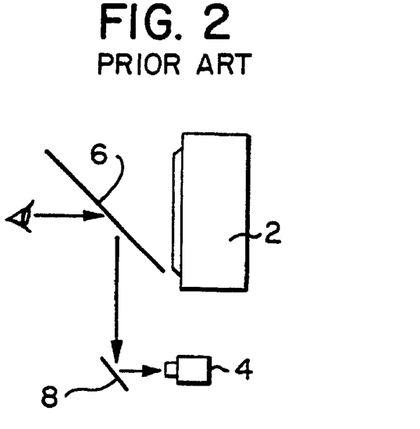
FIG. 2 illustrates a prior art flat beam-splitter arrangement with the display mounted behind the beam-splitter.

FIG. 2 illustrates a prior art teleconferencing flat beam-splitter arrangement that permits eye contact. In this arrangement the display 2 is placed behind the viewing side of the half-silvered mirror 6 which protrudes at or near a 45-degree angle. The first conferee peers through the mirror 6 to view the image of a second conferee on the display 2. The camera 4 captures the reflected image of the first conferee in the half-silvered mirror 6. A mirror 8 is optional and is used for aiming the camera 4. The housing (not shown) that contains the half-silvered mirror 6, the display 2, the mirror 8, and the camera 4 suffers from impractical bulk. This terminal is also impractical because the display 2 appears deeply recessed into the terminal, creating an awareness of distance between conferees.

Figure 3:
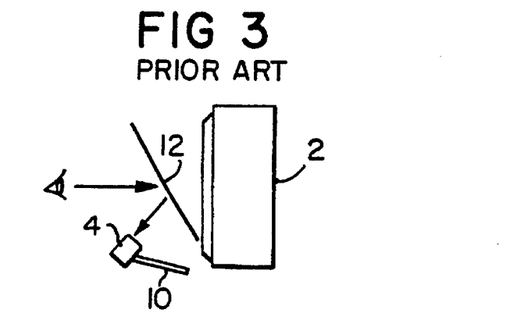
FIG. 3 illustrates a prior art flat beam-splitter with added polarizers to reduce the protrusion of the beam-splitter from the display.

FIG. 3 illustrates a prior art teleconferencing flat beam-splitter arrangement that permits eye contact. In an attempt to reduce the 45-degree angle protrusion of the half-silvered mirror 6, a partially-silvered mirror with a polarizer 12 has been employed. The use of polarizers permits the camera 4 to be angled toward the display 2, thereby reducing the beam-splitter's protrusion from 45 degrees to roughly 30 degrees. This mirror arrangement still, however, protrudes awkwardly from the display 2 and has, as well, a camera mount 10 that awkwardly, protrudes from the display 2. Another significant drawback of this terminal arrangement is that the added polarizers reduce display brightness noticeably, thereby effecting the quality of the teleconferencing experience.

Detailed Description of the Compact Teleconferencing Eye-Contact Terminal of the Present Invention To overcome the significant drawbacks of the front-mounted beam-splitters of the prior art, a uniquely configured beam-splitter that permits eye contact between conferees has been invented by this Applicant. By taking advantage of the fact that only a portion of a beam-splitter is used when capturing the reflected image of a conferee, only that portion is angled at or near a 45-degree angle from the display. This enables the beam-splitter to be of a significantly smaller area than the viewing surface of the display. As a result, the protrusion of the beam-splitter from the display is reduced substantially, thereby eliminating many drawbacks of the prior art. To achieve this improvement, the beam-splitter portion is seamlessly suspended in front of the viewing surface of the display.

Figure 4:
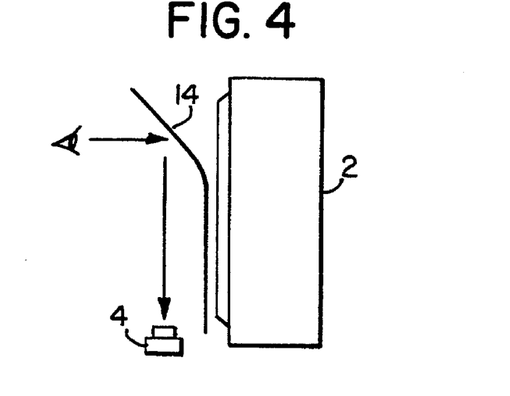
FIG. 4 illustrates a uniquely configured beam-splitter with one subtle curve that enables compactness.

FIG. 4 illustrates a uniquely configured beam-splitter that has one subtle curve that seamlessly connects a beam-splitter angled portion 46 (see FIG. 12) angled at or near 45 degrees to the display 2 to a section that is at or nearly parallel to the viewing side of the display. The beam-splitter angled portion 46 (see FIG. 12) is used to reflect the image of the second conferee for image capturing by the camera 4 placed below. This uniquely configured beam-splitter consists of a one-curve partially-silvered mirror. While the first conferee looks through this one-curve partially-silvered mirror, the curve and the angled portion appears transparent, permitting the entire image of the display 2 to be viewed without distortion.

Figure 5:
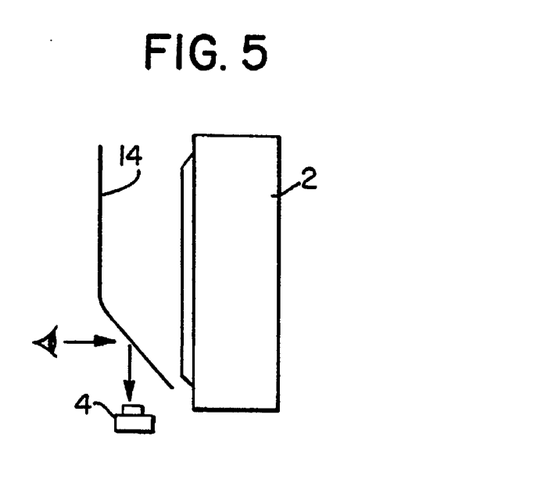
FIG. 5 illustrates another uniquely configured beam-splitter with one subtle curve that enables compactness.

FIG. 5 is like the one-curve partially-silvered mirror 14 of FIG. 4, except that it has been turned around and flipped upside down. Despite the altered arrangement, the one-curve partially-silvered mirror 14 performs in the same manner as described for FIG. 4. Here, however, the angled portion that reflects the image of the second conferee is located in front of the bottom half of the viewing side of the display 2.

Figure 6:
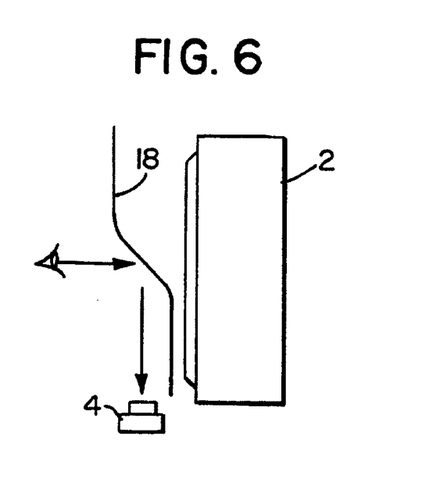
FIG. 6 illustrates a uniquely configured beam-splitter with two subtle curves that enables compactness.

Another version of the uniquely configured beam-splitter of the present invention is illustrated in FIG. 6. Here the angled portion 46 (see FIG. 12) used for reflecting the image of the first conferee, is suspended in front of the viewing side of display 2 by two subtle curves, each seamlessly integral to the portions of the beam-splitter that are approximately parallel to the display. This two-curve partially-silvered mirror 18 also performs in the same manner as described for FIG. 4. The entire two-curve partially-silvered mirror 18 permits light from the display 2 to pass through without distortion so that the entire image of display 2 can be viewed by the first conferee. Simultaneously, the camera 4 captures the reflected image of the first conferee from the angled portion 46 (FIG. 12) of the two-curve partially-silvered mirror 18.

Even though the camera 4 is illustrated in FIGS. 4, 5, and 6 below the uniquely configured beam-splitter and aimed upward, the camera 4 may also be mounted to the sides or top as well (not shown). The uniquely configured beam-splitter would appropriately be turned to accommodate these other camera placements.

While the one-curved partially-silvered mirror 14 and the two-curved partially-silvered mirror 18 are shown with a portion or portions parallel to the display and roughly a 45-degree angled portion 46 (FIG. 12), they need not be strictly limited to being parallel to the display with the angled portion angled at 45 degrees. Within the scope of this invention, the parallel portion 50 (FIG. 12) may slant away from or toward the display 2. In the case of the two-curved partially-silvered mirror 18, the parallel portions 50 (FIG. 12) may be slanted in the same direction or different directions. The parallel portions 50 (FIG. 12), as well, may be slightly curved instead of flat. The angled portion, as well, may be angled other than 45 degrees. Despite these minor variations, the functional principle of the uniquely configured beam-splitter remains constant, enabling a beam-splitter to be seamlessly suspended in front of the viewing surface of a display, thereby reducing the excessive protrusion of the prior art flat beam-splitter 6.

Though the following embodiments of the present invention are illustrated with and elaborated upon the use of the two-curve partially-silvered mirror 18, all of these embodiments are applicable to the one-curve partially-silvered mirror 14 illustrated in FIGS. 4 and 5. Adjustments and adaptations will be apparent to one of ordinary skill in the art.

Figures 7, 8, 9, 10:
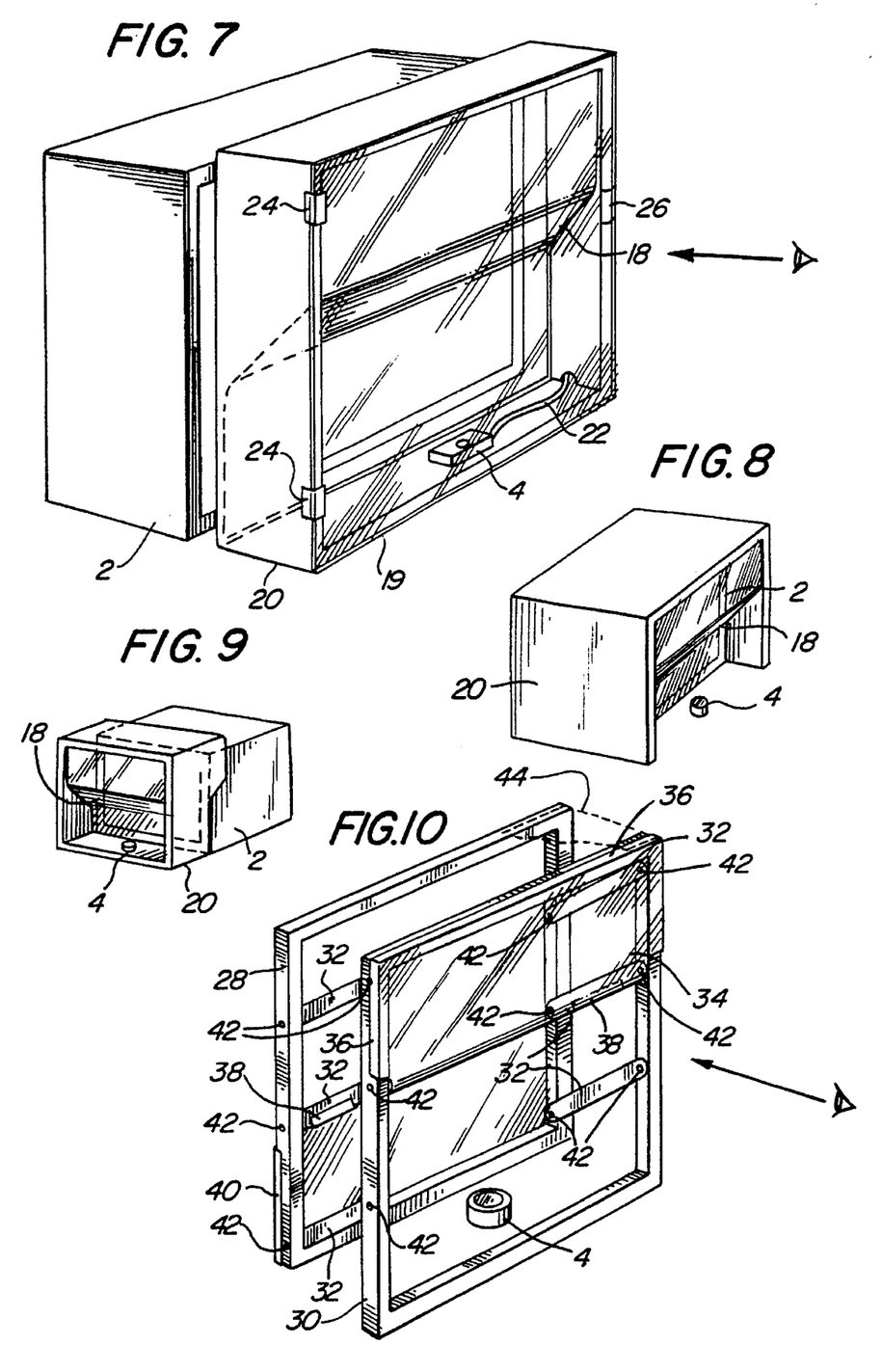
FIG. 7 illustrates a uniquely configured beam-splitter that is contained in a housing that is placed in front of a display.
FIG. 8 illustrates a uniquely configured beam-splitter that shares the same housing as a display.
FIG. 9 illustrates a uniquely configured beam-splitter that is contained within a housing that is attachable to a display.
FIG. 10 illustrates a flexible uniquely configured beam-splitter that enables a collapsible housing for compact storage.

FIG. 7 illustrates a preferred embodiment of the present invention. Here the two-curve partially-silvered mirror 18 is mounted within a housing 20 which is configured to be placed in front of the display 2. The camera 4 is positioned to capture the reflection of the first conferee from the angled portion of the two-curve partially-silvered mirror 18 viewing the display 2. A camera signal capture wire 22 passes the captured signal from camera 4 to the appropriate teleconferencing system for processing and transmission to the distant terminal (not shown). An optional flat glass 19 is placed in front of the two-curve partially-silvered mirror 18 to protect the two-curve partially-silvered mirror 18 and to enclose the camera 4 within the housing 20. The camera 4 can be manually positioned and aimed or removed and used for other purposes (such as a camcorder) by opening a flat glass 19 as a door made possible by a pair of hinges 24 and a door handle 26. The flat glass 19 can be configured to open by numerous other methods, such as slide tracks or snaps. As long as a method of positioning and aiming of the camera 4 is included (if it is needed), the flat glass 19 can be configured so that it cannot be opened. The flat glass 19 may also be used between the display 2 and the two-curve partially-silvered mirror 18 (not shown) so that the two-curve partially-silvered mirror 18 can be protected from immediate access from the back side.

The housing 20 of FIG. 7 is designed to be placed in front of the display 2 so that the consumer can easily add the device to an existing display 2. It has also been demonstrated that the housing 20 can be built integrally with the display 2 as seen in FIG. 8. In such an arrangement, the complete teleconferencing terminal includes the display 2 and the two-curved partially-silvered mirror 18, and these components are not intended to be separated except for repair or upgrade purposes. Camera 4 can be mounted on a surface other than the housing 20, as seen in FIG. 8, or can be mounted within housing 20, as seen in the next figure (FIG. 9). Still another configuration of the housing 20 is illustrated in FIG. 9 which allows the housing 20 to be removably connected to the display 2. The housing 20 in this configuration is designed to fit over the display 2 and thereby remain fixed in place. Additional connectors may also be used to attach the housing 20 to the display 2. Snaps, hooks, attachable slide connections, VELCRO™ hook-in-loop fasteners, among other connecting means, may be used for attaching the housing 20 to the display 2. In order to improve the performance of the two-curved partially-silvered mirror 18, the interior of the housing 20 may include a means to absorb light such as black paint. A special cavity (not shown) can be constructed as a part of the housing 20 to shade the portion of the housing from which the camera 4 is aimed from the light of the display 2 and ambient light. Such a cavity assists in the reduction of light interfering with the performance of the uniquely configured beam-splitter.

Other designs of the housing 20 not shown include shaping the sides of the housing 20 to the shape of the two-curve partially-silvered mirror 18. Here the housing 20 has a hood but only partial sides, which creates a less obtrusive housing 20. One drawback of this open design is that there is no base to the housing 20, so the unwanted reflection from the angled portion 46 (see FIG. 12) of a light colored table top (example for a desktop conferencing system) may interfere with the performance of the two-curve partially-silvered mirror 18. This can be easily resolved by placing a black or other light-absorbing mat on the part of the desk that may be reflected. Similarly, the camera 4 in all of the housing variations discussed is preferably painted black to reduce unwanted reflections. Ambient light may still, however, draw attention to the lens of the camera 4. This problem can be resolved by placing the camera 4 and any other optics such as small aiming mirrors within a box that has an opening just large enough to capture the image from the reflection from the two-curve partially-silvered mirror 18. By doing so, the camera 4 and other optics are shielded from ambient light, thereby avoiding unwanted reflections.

An alternate embodiment of the present invention utilizes a beam-splitter consisting of a flexible two-curve partially-silvered mirror 34 and is made of mirror-coated Mylar or similar performing substrate. The use of a flexible partially-silvered mirror permits the collapsing of the mirror for compact storage. As is illustrated in FIG. 10, the flexible two-curve partially-silvered mirror 34 is stretched over two metal frames 28 and 30. The flexible partially-silvered mirror 34 is stretched over the frame 30 and connected by tape 36. It is then connected to two of six extension arms 32 located in the center. The flexible two-curve partially-silvered mirror 34 is stretched and connected to the these extension arms 32 by tape 38 which forms the angled portion enabling reflection of the first conferee so that the camera 4 can capture the first conferee's reflection. Lastly, the flexible partially-silvered mirror 34 is stretched and connected to the frame 28 by tape 40. Extension arms 32 attach the frames 28 and 30 together and are attached to the frames by axle hinges 42. The axle hinges 42 enable the extension arms 32 to pivot, allowing the frames 28 and 30 to close upon one another for compact storage. The curves of the flexible two-curve partially-silvered mirror 34 serve as seamless hinges that stretch out flat when the frames are folded upon one another. A flexible housing 44 made of cloth or similar functioning material which is attached to the frames 28 and 30 by tape (not shown) folds up when the unit is closed and is stretched out to form a housing when the unit is opened.

The embodiments of the housing 20 previously described and those following are applicable to the flexible housing 44. Also, the embodiments of the two-curve partially-silvered mirror 18 previously described and those following are also applicable to the flexible two-curve partially-silvered mirror 34.

Figures 11, 15:
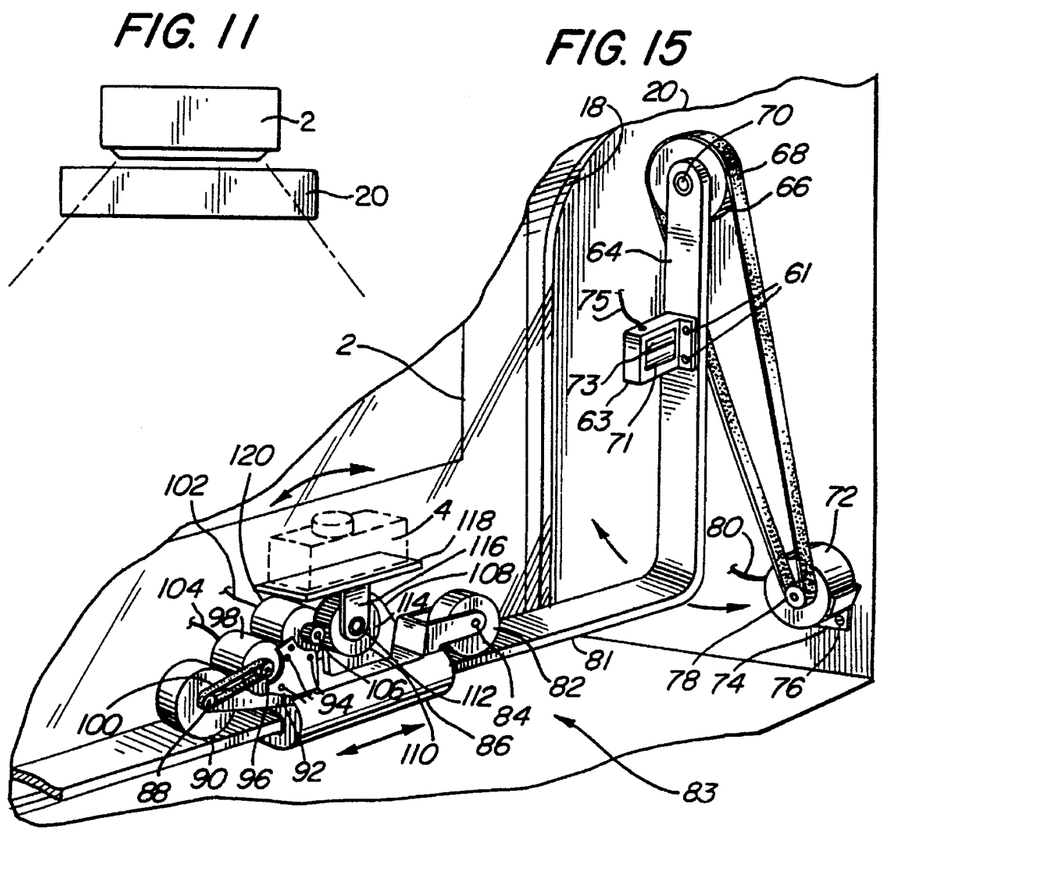
FIG. 11 illustrates a top view of a display and a uniquely configured teleconferencing beam-splitter housing that enables wide viewing angle of the display.
FIG. 15 illustrates a remote motorized positioning and aiming unit.

Because the housing 20 is in front of the viewing side of the display 2, it may block the view of the display at extreme angles. If extreme viewing angles are required, the problem is easily resolved by configuring the housing 20 to be larger than the display 2. FIG. 11 illustrates a top view of this configuration of the housing 20 and the display 2 that permits a wide viewing angle.

The uniquely configured beam-splitter of the present invention can be fabricated of various materials and by various methods. Glass substrates and plastic substrates that are transparent and free from impurities and irregularities is necessary. Fabrication methods such as cast molding, vacuum forming, and heating only the curved areas for the creating curves, to name only a few methods, are all sufficient for producing the uniquely configured beam-splitter. These fabrication shaping methods are not necessary for the flexible two-curve partially-silvered mirror 34 which is fabricated from partially-silvered Mylar or other mirrored flexible substrate.

Figures 12, 13:
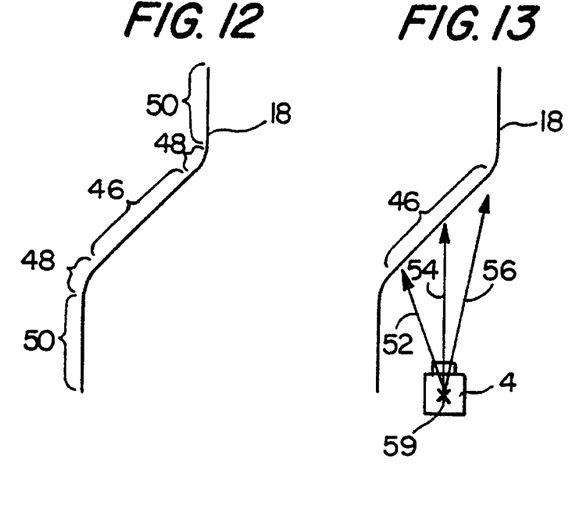
FIG. 12 illustrates functional areas of a uniquely configured beam-splitter.
FIG. 13 illustrates the performance characteristics of a pivot mount.

Those familiar with the art will appreciate that reflectivity and transparency of the uniquely configured beam-splitter can be changed according to desired performance characteristics. For many applications a partially-silvered mirror with 30% reflectivity and 70% transparency is adequate. However, reflectivity and transparency performance characteristics may be altered according to the particular application and type of beam-splitter. Some beam-splitters reflect unwanted light, such as ambient light, from parallel portions 50 of the two-curve partially-silvered mirror 18 as seen in FIG. 12. To lessen the reflectivity of parallel portions 50, the beam-splitter coating may be reduced or eliminated from the parallel portions 50. Likewise, the beam-splitter coating may be reduced or eliminated from curved areas 48 as well. The only portion of the uniquely configured beam-splitter that needs to be beam-splitter coated is the angled portion 46 that permits the reflection of the first conferee for image capturing. When the beam-splitter coating is reduced or eliminated from the parallel portions 50 and the curved areas 48, tapering the beam-splitter coating prevents the visible distortion caused by the harsh ending of the beam-splitter coating. Additional tints, contrast filters, neutral density filters, and light-absorbing coatings may be added to the parallel portions 50 and curved areas 48 to match the visible light reduction caused by the beam-splitter coating. These tints, contrast filters, neutral density filters, and light-absorbing coatings or even additives are tapered in with the tapering of the beam-splitter coatings to create a nonvisible transition of coatings or additives. The transition between coatings or additives may also be designed without tapering. In such an application, the transition seamlessly connects the coatings or additives by careful masking, thereby creating a nonvisible joint. Tints, contrast filters, neutral density filters, and light-absorbing coatings or additives can, as well, be added directly to the display viewing surface or between the display viewing surface and the two-curve partially-silvered mirror 18.

The construction of the present invention for desktop computer-based conferencing has been completed according to the following description. The housing 20 was constructed of acrylic plastic and formed around the outside perimeter of a 20-inch computer monitor as seen in FIG. 9 and attached to the display 2 using a hook-in-loop fastener (VELCRO™). The one-curve partially-silvered mirror 14 as seen in FIG. 4 was fabricated and mounted in the housing 20. The one-curve partially-silvered mirror 14 width is 18 inches. The parallel portion 50 extends from the bottom of the display 2 six inches, which transitions into the curved area 48 based upon a two-inch radius curve. The two-inch radius curved area 48 finally transitions into the angled portion 46, which extends out from the display 2 seven and one-half inches at a 40-degree angle from the display 2 viewing surface. Forty degrees was chosen because for an average height of a conferee when sitting and viewing a 20-inch computer monitor, eye level is higher than the center of the display. At 40 degrees the camera can capture an image aimed slightly upward to compensate for the height of the conferee. The camera 4 is mounted directly to the housing 20 and positioned to capture the reflection from the angled portion 46. Camera 4 aiming is made possible by the integral computer monitor stand, which permits aiming right and left and tilting up and down. The transparent substrate of the one-curve partially-silvered mirror 14 is ¼-inch float glass that was bent using zone bending techniques. Zone bending was used so that the angled portion 46 would not be distorted from excessive heat, thereby remaining a quality substrate to receive the beam-splitter coating. The angled portion 46 was coated with a titanium 30% reflective/70% transmissive beam-splitter coating. The curved area 48 and parallel portion 50 were coated with a light-absorbing coating that matched the transmission of the titanium beam-splitter coating. Chromaticity of the light-absorbing coating was also matched with the titanium beam-splitter coating. The titanium beam-splitter coating and light-absorbing coating was seamlessly connected by careful masking during the coating processes. The side closest to the display viewing surface was coated entirely with a antireflection coating to reduce ghost images. The application and matching of the coatings was performed by an optical specialist well versed in the optical coating art.

Depending upon the type of beam-splitter technology and the amount of reflectivity used, adjustments to the light sensitivity of camera 4 may improve image quality. These adjustments of the camera 4 compensate for any light reduction from the reflection of the conferee as a result of possible light loss due to the uniquely configured beam-splitter. Likewise, adjustments to the brightness of the display 2 may be warranted with use of some beam-splitter technology and the amount of reflectivity used for the uniquely configured beam-splitter. Such light sensitivity and brightness adjustments of the camera 4 and the display 2 is a simple procedure that can be performed by one of ordinary skill in the art.

Ambient light and extraneous display light in certain situations creates unwanted glare and reflections upon the uniquely configured beam-splitter, thereby drawing attention to its curves and planes. A method that takes attention away from unwanted glare reflections of the two-curve partially-silvered mirror 18 is to place the flat glass 19 of FIG. 7 in front of it as illustrated. In this arrangement the ambient light glare reflection is visible upon the entire flat glass 19 which draws attention away from the curves and planes of the two-curve partially-silvered mirror 18. The flat glass 19 may, as well, be positioned at various angles in relation to the display to reduce glare reflection. Another effective method to reduce unwanted glare and reflection is to use well-known antiglare and antireflection coatings and additives to the two-curve partially-silvered mirror 18 and/or the flat glass 19. These coatings and additives are effective on both the two-curve partially-silvered mirror 18 and the flat glass 19 of FIG. 7. These coatings and additives are also commonly included with many beam-splitters, especially those with relatively thick transparent substrates, to reduce the ghost images caused by the dual reflection upon both surfaces of the beam-splitter. These coatings and additives are readily adaptable to the present invention.

Figure 14:
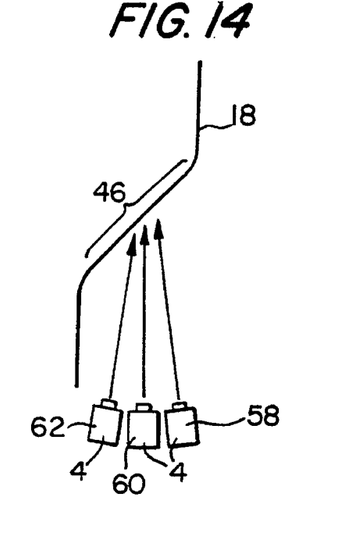
FIG. 14 illustrates an improved performance positioning and aiming mount.

Since the angled portion 46 of the uniquely configured beam-splitter is limited in area, camera positioning and aiming requires special attention. FIG. 13 illustrates the functioning of a common pivot mount used for camera aiming. Although a pivot-type camera mount may be used, it has inherent limitations when used with the uniquely configured beam-splitter of the present invention. FIG. 13 illustrates a pivot axis 59 of the camera 4 aimed in three directions. A first direction 54 is aimed onto the center of the angled portion that captures a quality reflection of the first conferee. However, when the camera 4 is pivoted in either a second or third direction 52 or 56, the captured image does not control a reflection of the conferee because the camera 4 is aimed away from the center of the angled portion 46. FIG. 14 illustrates the preferred camera aiming which requires the camera 4 to be physical positioned in strategic locations and then aimed in order to remain centered on the angled portion 46. Whether the camera is in position 58, 60, or 62, it remains centered on the angled portion 46, which enables quality image capturing in various directions. As a result, several new camera mounts have been devised by this Applicant so that the camera 4 can be positioned and aimed manually and also remotely by the use of motors.

FIG. 15 illustrates a preferred camera positioning and aiming unit 83 that is remotely controlled. This remote control unit is intended for use with a separate control pad (not shown) or by other control means such as voice activation. The control pad is connected to the camera positioning and aiming unit 83, either by a wireless technology such as infrared light or hard wired directly to the unit. A wireless technology requires a receiver and is attached on or near the display. One possible location is seen connected to a swing arm 81 which has attached to it a multiple purpose sensor mount 63 with infrared sensor 73 attached to the swing arm 81 by screws 61. A sensor wire 75 passes received instructions to the appropriate electronics that deciphers the function requested.

Remote positioning is made possible by the use of the swing arm 81 which physically moves the camera 4 so that up and down camera aiming is simulated by reflections of the angled portion 46 of the two-curve partially-silvered mirrored 18. The swing arm 81 is attached to the housing 20 by a pivot 70. Connected to the swing arm 81 is a large belt spool 66 that spins when a belt 68 is turned by a small belt spool 78 attached to a positioning motor 72. The positioning motor 72 is attached to the housing 20 by a motor frame 74 and a screw 76. A positioning wire 80 feeds electrical current to the positioning motor 72, which permits the positioning motor 72 to operate by control in two directions, enabling the swing arm 81 to move toward and away from the display 2 and two-curve partially-silvered mirror 18.

Attached to the swing arm 81 is a camera trolley 86 which permits horizontal movement of the camera 4 from side to side of the display 2. This feature is helpful for remotely positioning the camera 4 to particular window portions on the viewing surface of the display 2. This feature, however, is not necessary if the camera 4 is intended to be fixed at a particular portion of the screen. Horizontal movement is made possible by the camera trolley 86 which rolls upon the swing arm 81 by wheels 82 and 90. The wheel 82 is held in place by an axle 84 and wheel 90 and is held in place by an axle connected to a wheel spindle 88. Remote horizontal movement is made possible by a horizontal motor 98 through a small belt 100 attached to a horizontal motor spindle 96 which turns wheel spindle 88 that is connected to the wheel 90. A horizontal motor 98 is powered in two directions by the current supplied by a horizontal motor wire 104. The horizontal motor 98 is attached to the camera trolley 86 by a motor mount 92 by small screws 94.

To aim the camera to the right or left, a remote tilting vertical pad 118 has been devised to which the camera 4 is attached. The remote tilting vertical moving pad 118 is connected to a post 116. The post 116 is attached to a large sprocket 110, both of which are connected to a small pivot axle 112. The small pivot axle 112 is held in place by a fabricated brace 108 which is integral to the camera trolley 86. The fabricated brace 108 may also be attached directly to the swing arm 81 if, in a particular configuration, horizontal movement of the trolley 86 is not desired. A vertical motor 120 turns the large sprocket 110 by means of a small vertical sprocket 100. A vertical motor wire 102 supplies current that enables the vertical motor 120 to aim the remote tilting vertical moving pad 118 and the camera 4 to the left and right when capturing an image from the reflection of the two-curve partially-silvered mirror 18. The vertical motor 120 is attached to the camera trolley 86 by a motor mount 92 and small screws 94,. The motor mount 92 may also be attached directly to the swing arm 81 if horizontal camera movement is not needed in a particular configuration (not shown).

The camera positioning and aiming unit 83 of FIG. 15 is also ideally suited for auto-tracking the conferee as he or she moves about so that they remain centered in the captured frame. The swing arm 81, which positions the camera 4 for up and down tilt aiming, and the vertical moving pad 118, which aims the camera 4 to the right and left when capturing an image from the reflection of the two-curve partially-silvered mirror 18, may be used independently or in tandem with an auto-tracking system. Various autotracking systems use spatial orientation detection based upon light, heat, audio, and computer-based pattern recognition. Often these systems require the conferee to hold or wear a homing device such as an infrared emitter to help determine the conferee's spatial orientation. This spatial orientation information is then used to operate motors that aim the camera. In the current case, the spatial orientation information is used to signal direction and amount of turn for the positioning motor 72 and the vertical motor 120. Preset location aiming features and sensitivity features that determine the speed of tracking can be readily included within the swing arm 81 tracking system or similar system that permits positioning of the camera 4. An infrared motion sensor 71 is seen attached to the swing arm 81, but may be located in other places on or near the display 2 or the housing 20. Additional sensors (not shown) are often needed with most auto-tracking systems to triangulate the location of the conferee.

Figure 16:
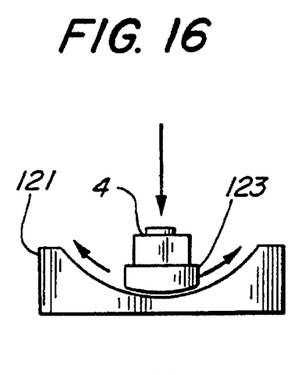
FIG. 16 illustrates the functioning of a crescent mount.

Another mechanical method for positioning the camera 4 in a similar manner to the swing arm 81 is the use of a crescent-shaped mount 121 as seen in FIG. 16. A crescent camera pad 123 travels the arc of the crescent-shaped mount 12 1, enabling the camera 4 positioning and aiming upon the uniquely configured partially-silvered mirror 18. This mount can be configured as a manual positioning mount or as a remotely controlled mount comprising a motor, sprockets, and a moving connection attached to the crescent camera pad 123 so that it may be mechanically positioned (not shown). Remotely controlled right and left image capturing and horizontal movement, as previously described, may also be adapted to this mount. Remotely controlled horizontal camera positioning can also be included by the use of a slide track or other means (not shown). Auto-tracking and its various features previously described can also be adapted to this crescent-shaped mount 121 and crescent camera pad 123.

Figure 17:
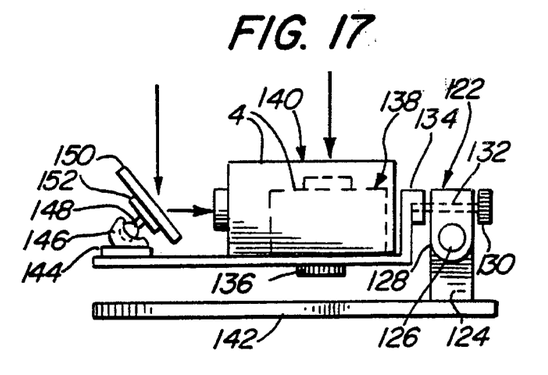
FIG. 17 illustrates a manual positioning and aiming mount and an aiming mirror.

A manual positioning and aiming unit 122 is illustrated in FIG. 17. It comprises a mount base 142 that has a post 124 connected to it. Attached to the post 124 is a swivel post 128 held in place by a twist knob 126. The twist knob 126 has a threaded screw (not shown) which attaches the swivel post 128 to the post 124, permitting a camera mount 134 to pivot left and right. The camera mount 134 is attached to the swivel post 128 by a screw twist knob 130 which permits up and down tilt aiming captured from the reflection of the two-curve partially-silvered mirror 18. The camera 4 may be attached to the camera mount 134 by a common camera mount screw knob 136. The camera in position 138 is aimed directly up to capture the reflection of the first conferee. When the camera 4 is large, such as a home camcorder, it may be more space efficient to mount this large camera 4 so that it is aimed in a sideways position 140 and then use the reflection of a mirror 150 to capture the reflection of the first conferee from the two-curve partially-silvered mirror 18. The mirror 150 is attached to an alignment ball pivot mount comprising a receptacle base 144, a receptacle 146, a stem 148, and a mount plate 152 to which is attached to the camera mount 134 so that the mirror 150 moves with the camera 4. Since the entire manual positioning and aiming unit 122 is mounted to the mount base 142, it may be moved manually into various positions to optimize the capturing of the reflection of the first conferee from various angles. The mount base 142 may be placed inside the housing 20 or rested directly on a desktop provided the housing 20 is constructed without a bottom side.

Figure 18:
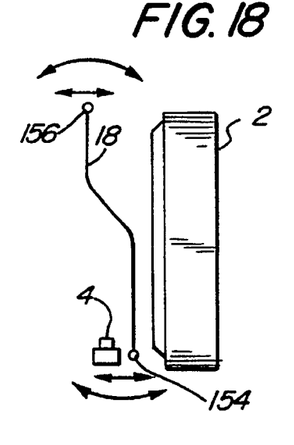
FIG. 18 illustrates various movements that enable a uniquely configured beam-splitter to be used for aiming.
Figure 19:
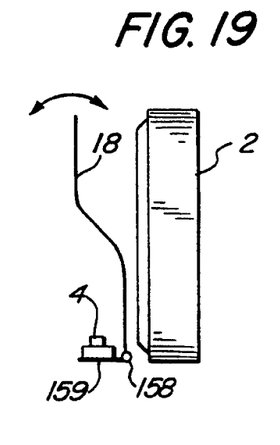
FIG. 19 illustrates a camera mount attached to a uniquely configured beam-splitter that can be aimed.
Figure 20:
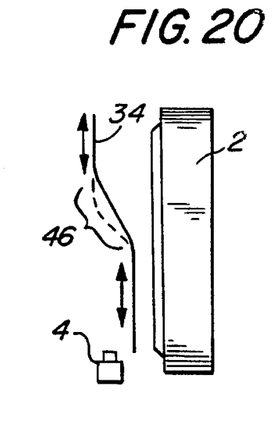
FIG. 20 illustrates a flexible uniquely configured beam-splitter that permits aiming.
Figure 21:
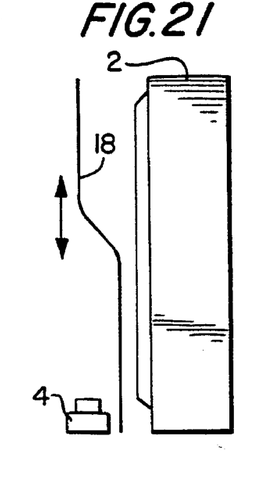
FIG. 21 illustrates a uniquely configured beam-splitter that can be moved up and down for flexible positioning in relation to the display.

Another method of capturing different views by the camera 4 is to physically move the two-curve partially-silvered mirror 18. FIG. 18 illustrates the placements of sliding hinges 156 and 154 attached to the top and bottom of the two-curve partially-silvered mirror 18, respectively. These sliding hinges 154, 156 are illustrated for maximum movement and are appropriately connected to the housing 20 (not shown). Here the two-curve partially-silvered mirror 18 can be moved toward and away from the display 2 either from the bottom, top, or both. Also, the sliding hinges 154, 156 permit tilting of the two-curve partially-silvered mirror 18 toward or away from the display 2. The camera 4, in this arrangement, is positioned and aimed to capture a quality reflection and may remain stationary or positioned and aimed to match the movement of the two-curve partially-silvered mirror 18. Another method that provides up and down tilt aiming for a stationary camera is to connect a camera platform 159 to a bottom hinge 158 as seen in FIG. 19. Connected to the bottom hinge 158 is the two-curve partially-silvered mirror 18 which, when leaned away and toward the display 2, enables the camera 4 on the camera platform 159 to move as well, thus permitting up and down tilt aiming. The flexible two-curve partially-silvered mirror 34 of FIG. 20 may also be used for aiming by shifting one or both of the parallel portions 50 (see FIG. 12) to the display, thus permitting the portion 46 to be angled at various degrees permitting up and tilt aiming. Lastly, FIG. 21 illustrates positioning of the entire two-curved partially-silvered mirror 18 up and down perpendicular to the display which allows changing a position of the angled portion 46 (see FIG. 12) in relation to the viewing surface of the display 2.

All of the previous two-curve partially-silvered mirror 18 movements are configurable with motorized systems permitting remote control operation. These movements may operate in tandem with the motorized camera positioning and aiming previously described. Auto-tracking systems, as well, are integrative with the two-curve partially-silvered mirror 18 movements.

Another aiming alternative allows motorized remote control and auto-tracking with a mirror 150 of FIG. 17 which may or may not be connected to the manual positioning and aiming unit 122.

Figures 22, 23:
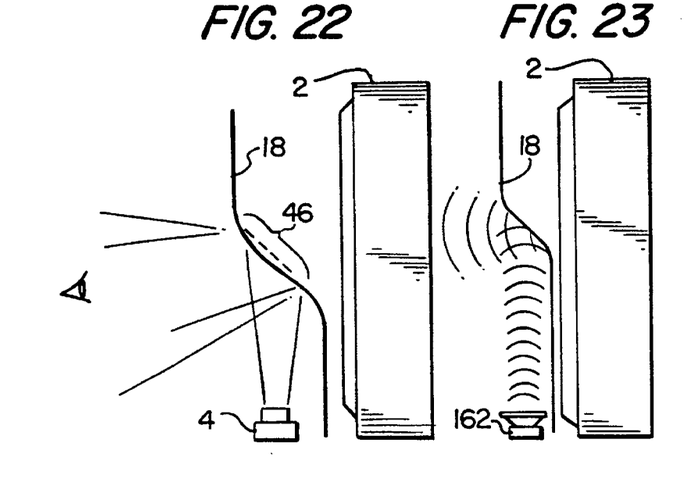
FIG. 22 illustrates a uniquely configured beam-splitter that is slightly curved that enables the camera to capture a wide field of view.
FIG. 23 illustrates a speaker of which sound is bounced off of the uniquely configured beam-splitter to give the impression sound is coming from the center of the display.

While the uniquely configured beam-splitter dramatically reduces beam-splitter protrusion over that of the prior art, an additional embodiment of the present invention reduces this protrusion to even a greater degree. FIG. 22 illustrates a two-curve partially-silvered mirror of which the angled portion 46 is slightly curved, forming a wide angle reflective surface. The reflection of this slightly curved angled portion 46 of the first conferee distorts the image of the conferee so that he or she appears squeezed. The image captured from this reflection can be corrected by well-known image processing techniques which correct this distortion by unsqueezing the image. Because only a portion of the captured image is utilized, resolution loss can be overcome by several well-known techniques. Resolution enhancement is possible if the camera 4 captures a higher resolution image than the display 2 is able to reproduce. Resolution can also be enhanced by image processing techniques such as edge blurring and element addition, to name only a few.

FIG. 23 illustrates the present invention with a speaker 162 that utilizes the configuration of the two-curve partially-silvered mirror 18 to bounce the sound of the speaker 162 to give the impression the sound originates from the center of the screen. Although this arrangement can be used with large group conferencing terminals configured with the present invention, it is ideally suited for use with desktop conferencing systems. In a typical desktop conferencing system the conferee viewing the display is usually about 24 inches away from the viewing surface of the display 2. With this speaker sound bounce arrangement, the quality of the conference is greatly improved by the fact that the distant conferee's voice appears to originate near the mouth displayed on the display 2. The speaker, as well, can be mounted on a pivot, allowing the conferee to direct the sound of the speaker in various directions toward and away from the two-curve partially-silvered mirror 18.

When an image is captured from the reflection from an odd number of mirrors, image reversal techniques are applied to correct the image. Image reversal techniques include special camera lenses and image reversal image processors. Other techniques, as well, may be applied when necessary to the present invention. When the image is reversed, a realistic representation can be transmitted to the distant terminal or a self-view feature can be used so that the conferee can properly frame himself or herself in the image displayed on display 2.

Modifications of the present invention may well be apparent as new teleconferencing, video camera, computer, and display technology develop during this time of global telecommunication transition. Modifications may include building components such as microphones, speakers (both monaural and stereo), and lights into the housing 20, or components are mounted within their own housings. Likewise, components that can be removably attached to the housing 20 will improve the functionality of the terminal, allowing for ease of upgrading. Lights to illumine the first conferee may also be placed behind the two-curve partially-silvered mirror 18. The addition of other optical additives, coatings, and films such as radiation reduction filters, polarizers, and contrast filters that improve display quality are modifications apparent to those skilled in the art.

As is the case with all eye contact terminal technology, eye contact cannot occur between conferees unless both conferees have an eye contact terminal. Even if only one conferee has an eye contact terminal, however, that conferee can transmit an eye contact signal for at least the other conferee to enjoy. In a multiple conferee session portions of the screen can be designated for simultaneously displaying several conferees. A more complex approach to multiple conferees who are at more than two terminals is to use multiple cameras side by side in order to transmit different points of view of the conferees as if sitting around a table. Although not shown, it will be apparent as to how side by side cameras would be configured to operate with the uniquely configured beam-splitter and housing 20.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved teleconferencing terminal to facilitate eye contact between a first conferee using the teleconferencing terminal and a second conferee, at a remote location, imaged on the teleconferencing terminal, the teleconferencing terminal comprising:

a housing;

image display means enclosed in the housing for displaying an image of the second conferee;

sound reproducing means for converting an audio signal from the second conferee to audible sound;

means for placing an image capture means in relation to the housing for capturing an image of the first conferee and for producing a video signal representative of that image for transmission to the second conferee;

sound capture means for capturing sounds from the first conferee and for producing an audio signal representative of those sounds for transmission to the second conferee;

a front mounted transparent substrate member attached to the housing, a first region of said transparent substrate member substantially parallel to a front surface of the image display means at one edge thereof and covering a portion of the image display means; and a substantially flat beam-splitter formed integrally as a reflective-transparent region of the transparent substrate member, angled in relation to a front surface of the image display means and seamlessly continuous with the first region of said transparent substrate member, the integral beam-splitter disposed to allow the image capture means unobtrusively to capture an image of the first conferee reflected by said integral beam-splitter while the first conferee gazes through said integral beam-splitter to make eye contact with the second conferee imaged on the image display means.

2. The improved teleconferencing terminal of claim 1, wherein the image capture means is removably attached so that said capture means can be used to capture images other than that of the first conferee.

3. The improved teleconferencing terminal of claim 1, wherein the sound reproducing means is disposed pointing towards the integral beam-splitter with sound issuing from the sound reproducing means deflected towards the first conferee by the integral beam-splitter thereby enhancing an illusion that the sound projects from the image of the second conferee.

4. The improved teleconferencing terminal of claim 1, wherein the image capture means is equipped with an aiming system so that the first conferee remains centered in the captured image.

5. The improved teleconferencing terminal of claim 4, wherein the aiming system is operated by a manual remote control.

6. The improved teleconferencing terminal of claim 4, wherein the aiming system is automatically operated by detecting spatial orientation of the first conferee.

7. The improved teleconferencing terminal of claim 4, wherein the aiming system operates by moving the image capture means relative to the integral beam-splitter.

8. The improved teleconferencing terminal of claim 4, wherein the aiming system operates by moving the image capture means and the integral beam-splitter relative to the first conferee.

9. The improved teleconferencing terminal of claim 4, further comprising a mirror provided between the integral beam-splitter and the image capture means so that light reflected from the first conferee is reflected by the integral beam-splitter and the mirror before reaching the image capture means and wherein the aiming system operates by changing a position of the mirror.

10. The improved teleconferencing terminal of claim 1, wherein the transparent substrate member is flexible so that the transparent substrate member, including the integral beam-splitter, can be collapsed to reduce the volume of the teleconferencing terminal for storage and transportation purposes.

11. An improved beam-splitter module to facilitate eye contact between a first conferee using a teleconferencing terminal containing an image display means equipped with the beam-splitter module and a second conferee imaged on the teleconferencing terminal, the beam-splitter module comprising:

a housing;

a transparent substrate member attached to the housing, a first region of said transparent substrate member substantially parallel to a front surface of the teleconferencing terminal at one edge thereof and covering a portion of the front surface of the teleconferencing terminal when the housing is placed in an operational position in relation to the teleconferencing terminal;

means for placing an image capture means in relation to the housing so that the image capture means captures an image of the first conferee and for producing a video signal representative of that image for transmission to the second conferee; and a substantially flat beam-splitter formed integrally as a reflective-transparent region of the transparent substrate member, angled in relation to a front surface of the teleconferencing terminal, and seamlessly continuous with the first region of said transparent substrate member, the integral beam-splitter disposed to allow the image capture means unobtrusively to capture an image of the first conferee reflected by said integral beam-splitter while the first conferee gazes through said integral beam-splitter to make eye contact with the second conferee imaged on the teleconferencing terminal.

12. The improved module of claim 11, wherein the module is removably attachable to the teleconferencing terminal and functions when attached.

13. The improved module of claim 11, wherein the module functions when disposed in front of the teleconferencing terminal.

14. The improved module of claim 11, wherein the teleconferencing terminal further comprises a sound reproducing means disposed to point towards the integral beam-splitter so that sound issuing from the sound reproducing means is deflected towards the first conferee by the integral beam-splitter thereby enhancing an illusion that the sound projects from the image of the second conferee.

15. The improved module of claim 11, wherein the image capture means is equipped with an aiming system so that the first conferee remains centered in the captured image.

16. The improved teleconferencing terminal of claim 15, wherein the aiming system is operated by a manual remote control.

17. The improved teleconferencing terminal of claim 15, wherein the aiming system is automatically operated by detecting spatial orientation of the first conferee.

18. The improved module of claim 15, wherein the aiming system operates by moving the image capture means relative to the integral beam-splitter.

19. The improved module of claim 15, wherein the aiming system operates by moving an image capture means and the integral beam-splitter relative to the first conferee.

20. The improved module of claim 15, further comprising a mirror provided between the integral beam-splitter and an attached image capture means so that light reflected from the first conferee is reflected by the integral beam-splitter and the mirror before reaching the image capture means and wherein the aiming system operates by changing a position of the mirror.

21. The improved module of claim 11, wherein the transparent substrate member is flexible so that the transparent substrate member, including the integral beam-splitter, can be collapsed to reduce the volume of the module for storage and transportation purposes.

22. An improved beam-splitter system for use with a video display for teleconferencing to facilitate eye contact between a first conferee at a video display equipped with the improved beam splitter system and a displayed image of a second conferee, the beam-splitter system comprising:

a transparent substrate member disposed in operative relation to the video display, a first region of said transparent substrate member substantially parallel to a front surface of the video display at one edge thereof and covering a portion of the front surface of the video display; and a beam-splitter formed integrally as a reflective-transparent region of the transparent substrate member, angled in relation to a front surface of the video display, and seamlessly continuous with the first region said transparent substrate member, the integral beam-splitter disposed to allow an image capture means unobtrusively to capture an image of the first conferee reflected by said integral beam-splitter while the first conferee gazes through said beam-splitter to make eye contact with the second conferee imaged on the video display.

23. The improved beam-splitter system of claim 22, wherein a curved region separates the reflective-transparent region from the first region of said transparent substrate member.

24. The improved beam-splitter system of claim 22, wherein the reflective-transparent region is separated from the first region of said transparent substrate member by a first curved region and wherein the transparent substrate member further comprises a second region substantially parallel to the front surface of the video display, said second region of said transparent substrate member being separated from the reflective-transparent region by a second curved region.

25. The improved beam-splitter system of claim 22, wherein the integral beam-splitter is curved so as to capture a wider angle of view with a smaller beam-splitter and a resulting distortion of the image of the first conferee is corrected optically or electronically.

26. The improved beam-splitter system of claim 22, wherein an antireflective coating is applied to the transparent substrate member to suppress undesired reflections.

27. The improved beam-splitter system of claim 22, wherein the regions of said transparent substrate member not forming the integral beam-splitter are coated with transparent light absorbing material so as to disguise any apparent change of brightness of the image of the video display caused by the integral beam-splitter.

28. The improved beam-splitter system of claim 22, wherein coatings on the transparent substrate are selected so as minimize any variation of chromaticity.

29. The improved beam-splitter system of claim 22, wherein the transparent substrate member is flexible.

\* \* \* \* \*